US012627902B2

(12) United States Patent
Pimpinella et al.

(10) Patent No.: US 12,627,902 B2
(45) Date of Patent: May 12, 2026

(54) COMPUTATIONALLY ENHANCED LOW-PERFORMANCE INFRARED FOCAL PLANE ARRAYS

(71) Applicants: Richard Edward Pimpinella, Oswego, IL (US); Christopher Frank Buurma, Columbus, OH (US); Nigel D. Browning, Formby (GB)

(72) Inventors: Richard Edward Pimpinella, Oswego, IL (US); Christopher Frank Buurma, Columbus, OH (US); Nigel D. Browning, Formby (GB)

(73) Assignee: Sivananthan Laboratories, Inc., Bolingbrook, IL (US)

( * ) Notice: Subject to any disclaimer, the term of this patent is extended or adjusted under 35 U.S.C. 154(b) by 247 days.

(21) Appl. No.: 17/739,844

(22) Filed: May 9, 2022

(65) Prior Publication Data

US 2022/0408033 A1      Dec. 22, 2022

Related U.S. Application Data

(60) Provisional application No. 63/185,934, filed on May 7, 2021, provisional application No. 63/185,940, filed on May 7, 2021.

(51) Int. Cl.
*H04N 25/44*      (2023.01)
*G06T 5/77*      (2024.01)
(52) U.S. Cl.
CPC .............. *H04N 25/44* (2023.01); *G06T 5/77* (2024.01); *G06T 2207/10024* (2013.01); *G06T 2207/10036* (2013.01); *G06T 2207/10048* (2013.01); *G06T 2207/20221* (2013.01)
(58) Field of Classification Search
CPC ........ H04N 25/40; H04N 25/33; H04N 23/23; H04N 23/11; H04N 23/10; H04N 23/21; G06T 5/005; G06T 2207/10036; G06T 2207/10048
See application file for complete search history.

(56) References Cited

U.S. PATENT DOCUMENTS

| | | | |
|---|---|---|---|
| 4,956,686 | A | 9/1990 | Borrello et al. |
| 5,196,703 | A | 3/1993 | Keenan |
| 5,431,328 | A | 7/1995 | Chang et al. |
| 5,479,032 | A | 12/1995 | Forrest et al. |
| 5,518,934 | A | 5/1996 | Forrest et al. |
| 5,581,084 | A | 12/1996 | Chapman et al. |
| 6,580,509 | B1 | 6/2003 | Hutchin et al. |
| 6,657,194 | B2 | 12/2003 | Ashokan et al. |
| 7,336,353 | B2 | 2/2008 | Brady et al. |
| 7,462,831 | B2 | 12/2008 | Gooch et al. |
| 7,840,086 | B2 | 11/2010 | Bertozzi et al. |
| 8,233,148 | B2 | 7/2012 | Bodkin et al. |
| 8,570,442 | B2 | 10/2013 | Mestha et al. |
| 8,717,551 | B2 | 5/2014 | Baraniuk et al. |
| 9,325,947 | B2 | 4/2016 | Bridge et al. |

(Continued)

*Primary Examiner* — Kathleen V Nguyen
(74) *Attorney, Agent, or Firm* — Erickson Law Group, PC

(57) ABSTRACT

A method uses inpainting, whereby the ability to optimize the reconstruction of images at high resolution and sensitivity with minimal pixels is hard wired into the IRFPA. By combining several of these systems, or by selecting different pixels in the array to form images of different colors, hyperspectral images and 3-D tomograms can also be obtained with a significantly smaller number of pixels.

8 Claims, 4 Drawing Sheets

Identify Best Pixels S_best<<NxN    Reduced Sampled Image        Inpainted                Fully Sampled

N

Best Pixels "X"

(56)            References Cited

U.S. PATENT DOCUMENTS

| | | | |
|---|---|---|---|
| 9,410,850 B2 | 8/2016 | Novotny et al. | |
| 9,467,628 B2 | 10/2016 | Geng et al. | |
| 9,538,098 B2 | 1/2017 | Hoye et al. | |
| 9,883,178 B2 | 1/2018 | Chiu et al. | |
| 9,921,106 B1 | 3/2018 | Davis | |
| 10,139,276 B2 | 11/2018 | Killey | |
| 10,224,175 B2 | 3/2019 | Steven et al. | |
| 10,256,072 B2 | 4/2019 | Steven et al. | |
| 10,302,491 B2 | 5/2019 | Gesemer et al. | |
| 10,373,339 B2 | 8/2019 | Miller et al. | |
| 10,431,419 B2 | 10/2019 | Kovarik et al. | |
| 10,580,614 B2 | 3/2020 | Stevens et al. | |
| 10,740,881 B2 | 8/2020 | Wang et al. | |
| 11,056,314 B2 | 7/2021 | Hujsak et al. | |
| 11,080,833 B2 | 8/2021 | Barnes et al. | |
| 11,187,718 B2 | 11/2021 | Clark et al. | |
| 2013/0083312 A1* | 4/2013 | Baraniuk | G01J 3/51 |
| | | | 356/402 |
| 2014/0363099 A1* | 12/2014 | Evers-Senne | G06T 5/50 |
| | | | 382/284 |
| 2016/0044306 A1* | 2/2016 | Chahine | H04N 25/671 |
| | | | 348/175 |
| 2018/0293331 A1 | 10/2018 | Olson et al. | |
| 2019/0257987 A1 | 8/2019 | Saari et al. | |
| 2020/0292463 A1* | 9/2020 | Kang | G01N 21/8806 |
| 2020/0319027 A1* | 10/2020 | Fox | G01J 3/513 |
| 2022/0333996 A1* | 10/2022 | Browning | H04N 23/20 |
| 2022/0408035 A1 | 12/2022 | Pimpinella et al. | |

* cited by examiner

COMPUTATIONALLY ENHANCED LOW-PERFORMANCE INFRARED FOCAL PLANE ARRAYS

This application claims the benefit of U.S. Provisional Applications Ser. Nos. 63/185,934 filed May 7, 2021 and 63/185,940 filed May 7, 2021.

BACKGROUND

Infrared Focal Plane Arrays (IRFPAs) are used in a wide number of applications related to the creation of thermal images. However, IRFPAs are currently limited due to the cost of manufacturing the IRFPA. At the highest level of sensitivity and resolution, IRFPAs are manufactured by Molecular Beam Epitaxy (MBE) or other state-of-the-art atomic/molecular deposition methods and can cost over $100,000 to produce. The cost of these detectors is determined primarily by the need to limit pixel-to-pixel variations in sensitivity that can cause blurring in the images or a loss of data. Further costs in practical applications of these systems include the need for extensive cooling systems that reduce the noise and improve the sensitivity of the resulting images. Previous approaches to improving IRFPAs have mainly focused on improving the manufacturing of the hardware; few advances have focused on changing the mechanisms by which the image is acquired and simultaneously processed.

The present inventors recognize a desire to improve performance of IRFPAs after manufacture, by improving the methods of image acquisition and processing. The present inventors recognize that this could lead to a reduction in cost, both by improving the performance of more inexpensively manufactured IRFPAs, as well as a reduction in cooling system requirements during operation of said IRFPAs.

The present inventors have recognized a desire to make processing requirements less stringent and the accuracy needed in pixel-to-pixel variations in signal-to-noise ratio more relaxed, and such a relaxation in tolerances significantly reduces the expensive parts of the synthesis and application of IRFPAs.

The present inventors have recognized a desire to optimize inpainting in IRFPA hardware to enhance the reconstruction of images with minimal pixels, while maintaining high resolution and sensitivity.

SUMMARY

An exemplary method of the invention uses inpainting, whereby the ability to optimize the reconstruction of images at high resolution and sensitivity with minimal pixels is hard wired into the IRFPA. By combining several of these systems, or by selecting different pixels in the array to form images of different colors, hyperspectral images and 3-D tomograms can also be obtained with a significantly smaller number of pixels.

Examples of hyperspectral imaging systems are described in U.S. Pat. Nos. 6,580,509; 8,233,148; 8,570,442; 9,538,098; 9,921,106; 10,139,276; and 10,373,339, all herein incorporated by reference to the extent the contents are not contrary to the present disclosure.

U.S. Pat. No. 10,256,072, hereby incorporated by reference to the extent the contents are not contrary to the present disclosure, describes high quality images obtained from cameras where there are a significant number of missing pixels. Eliminating up to 95% of the pixels can still result in an image with negligible loss in quality. For IRFPAs, the implementation of inpainting means that after manufacturing, up to 95% of the lowest quality pixels can be eliminated from the image acquisition with negligible loss in the resulting contrast, resolution and sensitivity of the images. Other inpainting methods are known, such as disclosed in U.S. Pat. Nos. 7,840,086 and 10,224,175, hereby incorporated by reference to the extent the contents are not contrary to the present disclosure.

Disclosed herein are methods and systems for reconstructing images of high resolution and sensitivity from minimal pixels in IRFPAs, thereby improving the performance of IRFPAs manufactured by lower cost methods, such as lower precision deposition methods, faster and lower tolerance application of MBE and other state-of-the-art deposition methods, or by the preparation of colloidal quantum dots (CQDs) of different sizes. In particular, the use of inpainting methods coupled with machine learning can overcome a range of previously limiting measures of performance of IRFPAs produced by these lower cost methods, such as dark current levels, spectral and broadband quantum efficiency, responsivity, detectivity, noise levels, noise-equivalent differential temperature, noise equivalent irradiance, noise equivalent power, resistance-area product at nominal zero bias, dynamic resistance, and other derived and related standard figures of merit.

In some embodiments, Low Quality FPAs can be synthesized by MBE (CQDs or any other growth mode) and tested by uniform illumination of different colors to map the initial hyperspectral response function of the system.

In some embodiments, the system identifies the "best" pixels and uses them to form the image. Each IRFPA is now categorized by its best pixels, rather than by the variation in the worst pixels (as in higher quality FPAs).

In some embodiments, by selecting a small fraction of pixels for the readout, the FPA can be equivalent to a much higher quality detector. The FPA can operate at higher speed because fewer pixels means less read out time. The FPA can operate with higher sensitivity because it can integrate longer on each pixel that is being used, giving better signal-to-noise ratio due to the sub-sampling. In other words, a sub-sampled IRFPA can be computationally equivalent to a much higher quality detector, while operating at a faster speed (since fewer pixels requires less read out time), or with higher sensitivity (since the IRFPA can integrate longer on each pixel, giving higher signal to noise ratio).

In some embodiments, multiple inexpensive detectors or a selection of pixels from a single detector can be combined in situations where a single detector was previously used, and this new combination offers the potential for hyperspectral images, reconstructions with different wavelengths, and the formation of 3-D structures (since each detector represents a different view of the object).

The embodiments of the invention allow a computational scheme in which cameras failing specifications for their rated application have pixels deliberately selected to reconstruct and form the full image during operation. The embodiments of the invention provide an infrared imaging system comprised of a focal plane array, readout electronics and a computing system in which the pixels are computationally enhanced during operation. The pixels can be automatically classified based on their performance levels. The pixels can be subsequently replaced by the computing system. The pixels can be identified to cause a heavy bias and then computationally corrected. The pixels are used over a series of frames to reconstruct an image with higher spatial resolution and/or lower temporal noise.

Numerous other advantages and features of the present invention will be become readily apparent from the following detailed description of the invention and the embodiments thereof, and from the accompanying drawings.

DETAILED DESCRIPTION

Figure 1:
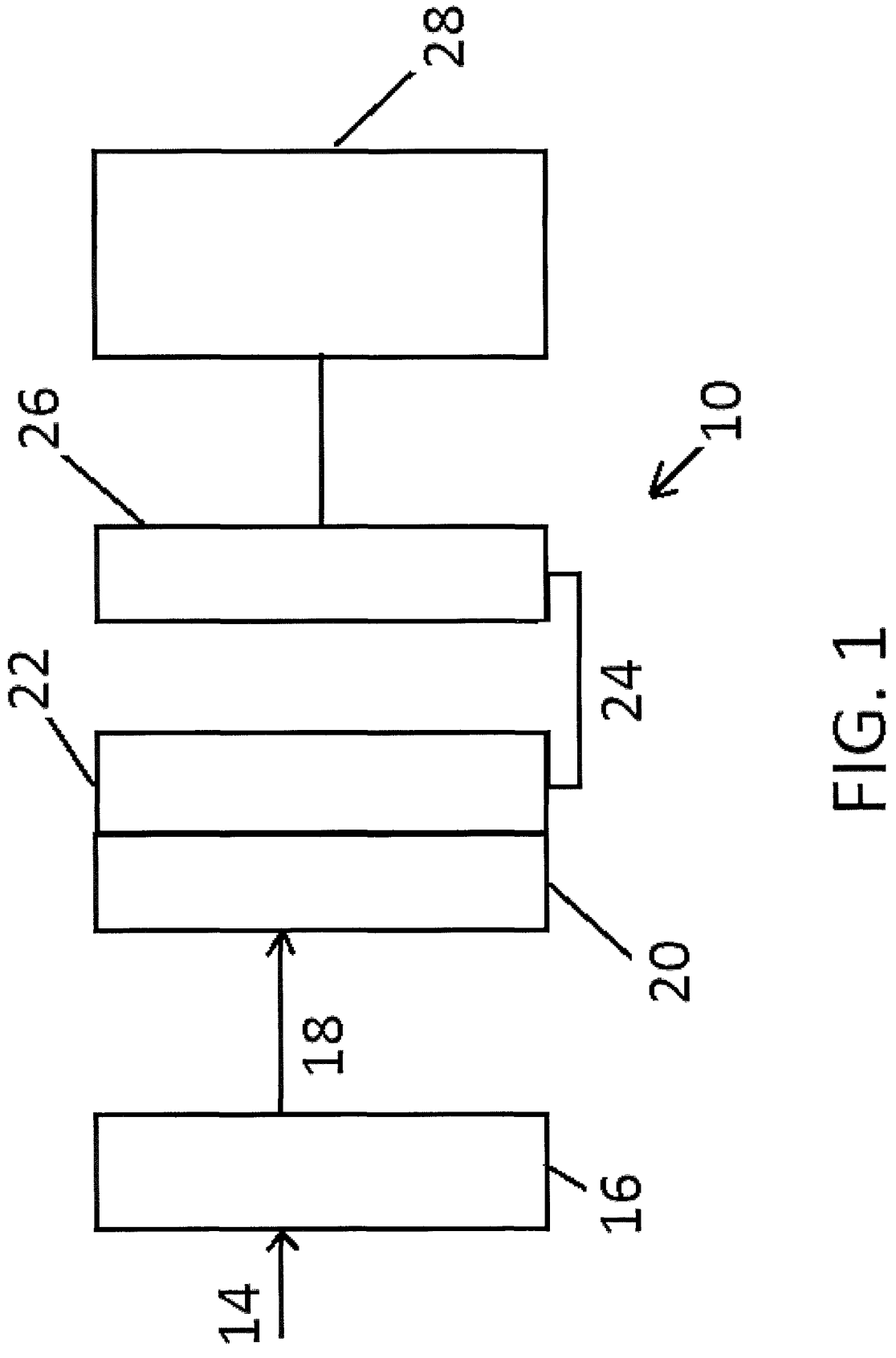
FIG. 1 is a schematic view of an exemplary system of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application Ser. No. 63/185,940 filed May 7, 2021; U.S. Provisional Application Ser. No. 63/185,934 filed May 7, 2021 and U.S. Pat. No. 10,256,072 in their entireties to the extent that they are not contrary to the teaching of the present disclosure. This application also incorporates U.S. Ser. No. 17/687,170 filed Mar. 4, 2022 in its entirety to the extent that it is not contrary to the teaching of the present disclosure.

An imaging system 10 according to the invention is shown in FIG. 1. The system 10 may include optical components 16 receiving infrared radiation 14, one or more IRFPAs 20, such as multi-color focal plane arrays, receiving infrared radiation from the optical components 16, readout electronics 22, such as a read-out integrated circuit (ROIC) generating signals 24 corresponding to the working pixels of the IRFPA 20, control electronics 26 receiving the signals 24, and a computing system 28 receiving signals from the control electronics. The computing system 28 chooses signals corresponding to a sub-sampled acquisition of the working pixels. IRFPA structures are described in U.S. Pat. Nos. 4,956,686; 5,479,032; 5,518,934; 6,657,194 and 9,883, 178 herein incorporated by reference to the extent they are not contrary to the present disclosure. ROIC structures are described in U.S. Pat. Nos. 9410,850; 5,431,328; 7462,831; 5,196,703; 6,657,194 and 5,581,084, herein incorporated by reference to the extent they are not contrary to the present disclosure.

Using an inpainting method, the computing system 28 outputs a reconstructed image approximating the image otherwise generated by all of the working pixels, from a sub-sampled acquisition of the working pixels. Sub-sampling and inpainting algorithms are disclosed in U.S. Pat. Nos. 7,840,086; 10,224,175 and 10,256,072 herein incorporated by reference to the extent that they are not contrary to the present disclosure. The output from the computing system can be to a user interface, such as to a screen. Other inpainting techniques are known and examples are described in U.S. Pat. Nos. 9,467,628; 10,431,419; 11,056314; 10,740, 881 and 11,080,833 herein incorporated by reference to the extent that they are not contrary to the present disclosure.

The IRFPA can be manufactured by any method to have a wide range of responses from the individual pixels in the detector. This range of performance could be caused by deliberate lower precision manufacturing methods, such as the creation of pixels from different sizes of CQDs or reduced quality control in high cost atomic/molecular deposition processes, or simply that one batch of active arrays did not meet the tolerances of the highest level detectors for any number of reasons.

Figure 2:
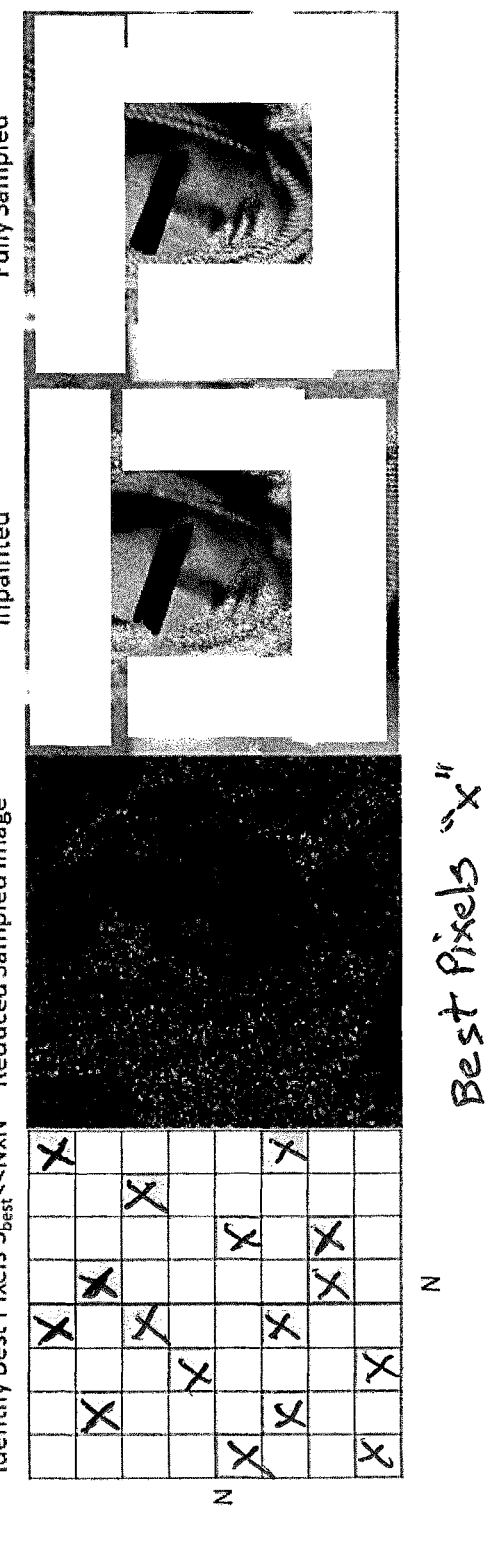
FIG. 2 is a demonstrative figure showing a method of inpainting using best pixels, some portions of the images have been redacted.

As demonstrated in FIG. 2, by illuminating the array with EM radiation of the desired wavelength, MWIR, LWIR, SWIR etc., the top 1-5% best responding pixels can be identified. These are the only pixels used to form the sub-sampled acquisition, that is then reconstructed using inpainting. The inpainted image is comparable to a fully sampled image as shown.

Figure 3:
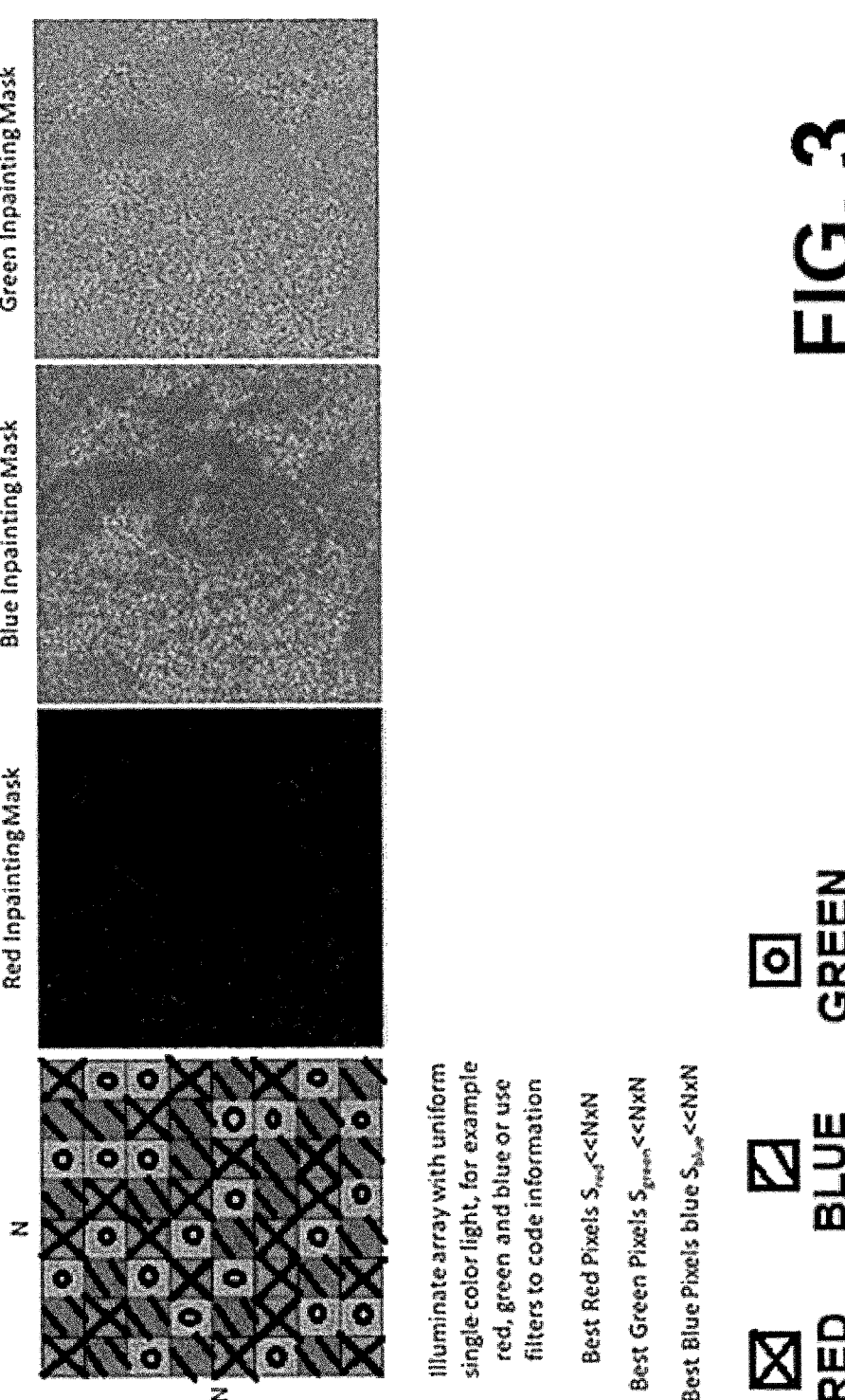
FIG. 3 is a demonstrative figure showing a method of inpainting using best pixels for three wavelengths of light, red, blue and green.
Figure 4:
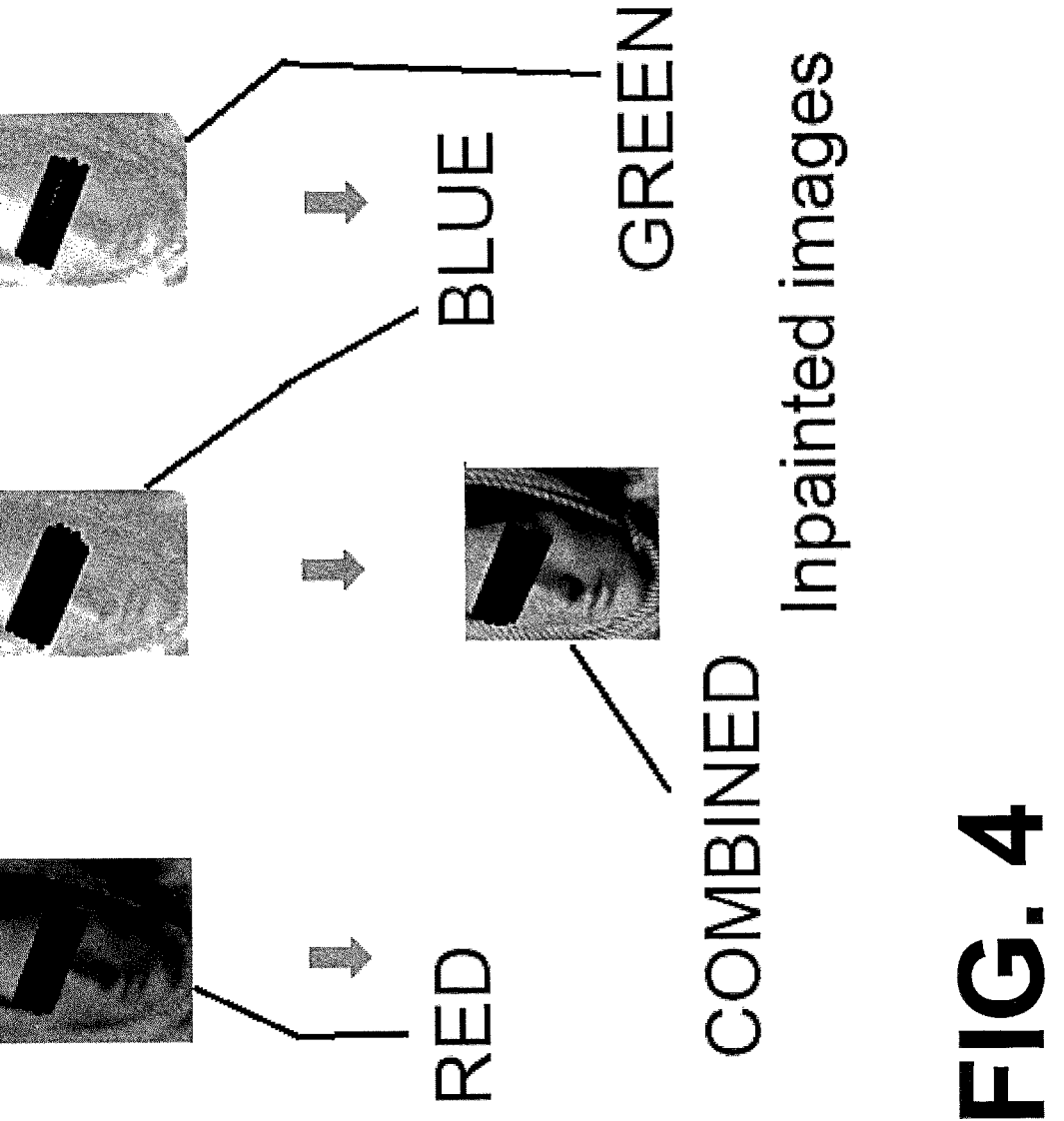
FIG. 4 is a demonstrative figure showing inpainted images using the masks shown in FIG. 3 and a combined image, some portions of the images have been redacted.

As shown in FIG. 3, the same array IRFPA can be illuminated with multiple wavelengths to identify the best performing pixels for SWIR, LWIR and MWIR, for example. These pixels form the masks for the individual color images that can be combined together to form an inpainted hyperspectral image shown in FIG. 4.

The initial step is to determine which pixels in the camera are most sensitive to each selected wavelength—this is done by illuminating the camera with a single wavelength and mapping the response. This only needs to be done once per wavelength and can be done during the manufacture of the camera. Once the best pixels for each wavelength are identified, those pixels become the sub-sampled mask for that wavelength. The software can correlate that wavelength to a color, e.g., red, green or blue.

From the total image, a red image is inpainted from the best red pixels, a green image is inpainted from the best green pixels and a blue image is inpainted from the best blue pixels. The separation of the pixels into colors is performed by the software, as is the inpainting.

When the whole image is read out, it contains red, blue and green sub-sampled images that are reconstructed using inpainting methods. Accordingly, scanning over a large range of different images for the different energy range is not required, all the information is in a single image.

If the whole imaging array is used for the hyperspectral data cube then the detector will have the regular read-out performance, i.e., speed. If a smaller number of pixels is used for read-out, then the detector can balance read-out speed against the breadth of the hyperspectral datacube.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of acquiring an image, comprising the steps of:

illuminating an infrared focal plane array (IRFPA) with electro-magnetic (EM) radiation of a desired infrared wavelength;

identifying best responding pixels;

using the best responding pixels, forming a sub-sampled acquisition; and reconstructing the image from the sub-sampled acquisition using inpainting.

2. The method according to claim 1, wherein the step of illuminating is further defined by illuminating the infrared focal plane array (IRFPA) with multiple wavelengths to identify the best performing pixels for short wavelength infrared (SWIR), long wavelength infrared (LWIR) and medium wavelength infrared (MWIR);

forming masks for individual color images by inpainting; and combining the masks together to form an inpainted hyperspectral image.

3. The method according to claim 1, wherein the best performing pixels are mapped to the IRFPA for the sub-sampled acquisition.

4. The method according to claim 1, wherein the best performing pixels are determined for each of multiple wavelengths illuminated on the IRFPA, and maps are formed for each wavelength illuminated on the IRFPA, and using the maps, masks are formed for individual color images by inpainting; and combining the masks together to form an inpainted hyperspectral image.

5. The method according to claim 4, wherein the multiple wavelengths illuminated on the IRFPA are illuminated sequentially to form maps for each of the multiple wavelengths.

6. An infrared imaging system comprised of a focal plane array, readout electronics and a computing system in which the pixels are computationally enhanced during operation by during manufacturing of the infrared imaging system, illuminating the focal plane array with electro-magnetic (EM) radiation of a desired infrared wavelength;

identifying best responding pixels for the desired infrared wavelength and forming a mapping of the best responding pixels for the infrared imaging system; and during operation, using the mapping, forming a sub-sampled acquisition of the best performing pixels; and reconstructing the image from the sub-sampled acquisition using inpainting.

7. The system according to claim 6, wherein the best performing pixels are determined for each of multiple desired wavelengths illuminated on the IRFPA and maps are formed for each wavelength illuminated on the IRFPA, and using the maps, masks are formed for individual color images by inpainting; and combining the masks together to form an inpainted hyperspectral image.

8. The method according to claim 6, wherein the multiple desired wavelengths illuminated on the IRFPA are illuminated sequentially to form maps for each of the multiple desired wavelengths.

* * * * *